United States Patent [19]
Leclerc

[11] Patent Number: 5,823,269
[45] Date of Patent: Oct. 20, 1998

[54] TURF AERATOR ATTACHMENT FOR TRACTOR

[76] Inventor: Francois Leclerc, 8800 Othello, Brossard, Quebec, Canada, J4Y 3A7

[21] Appl. No.: 828,805

[22] Filed: Mar. 27, 1997

Related U.S. Application Data

[60] Provisional application No. 60/014,164, Mar. 27, 1996.
[51] Int. Cl.⁶ .................................................. A01B 45/02
[52] U.S. Cl. ............................................. 172/21; 172/540
[58] Field of Search ................................ 172/21, 22, 518, 172/537, 540, 554, 555, 556, 574, 576, 599, 600, 601, 602, 603, 604, 651

[56] References Cited

U.S. PATENT DOCUMENTS

| | | | |
|---|---|---|---|
| 3,995,569 | 12/1976 | Picardat | 172/21 X |
| 4,094,363 | 6/1978 | McCoomb | 172/21 X |
| 4,776,404 | 10/1988 | Rogers et al. | 172/21 |
| 4,840,232 | 6/1989 | Mayer | 172/21 |
| 5,020,602 | 6/1991 | Dellinger | 172/21 |
| 5,460,229 | 10/1995 | Mattis | 172/21 |
| 5,586,604 | 12/1996 | Postema | 172/21 |
| 5,623,996 | 4/1997 | Postema | 172/21 X |

FOREIGN PATENT DOCUMENTS

| | | | |
|---|---|---|---|
| 679253 | 9/1952 | United Kingdom | 172/21 |

*Primary Examiner*—Michael J. Carone
*Assistant Examiner*—Christopher J. Novosad
*Attorney, Agent, or Firm*—Eric Fincham

[57] ABSTRACT

An aerator apparatus suitable for use with a tractor, the apparatus comprising a frame and a plurality of aerator disc assemblies. Each aerator disc assembly comprises a plurality of aerator discs and a pair of aerator disc mounting arms extending between the frame and the aerator disc axle. The mounting arms are rotatably journalled on the frame to thereby permit pivotable movement of each of the aerator disc assemblies. Interconnecting means are utilized to interconnect the aerator disc assemblies. The arrangement allows for the turning of the aerator apparatus without damage to the equipment and turf.

6 Claims, 3 Drawing Sheets

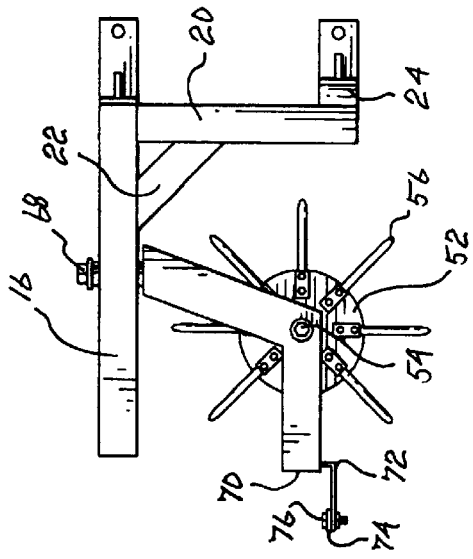
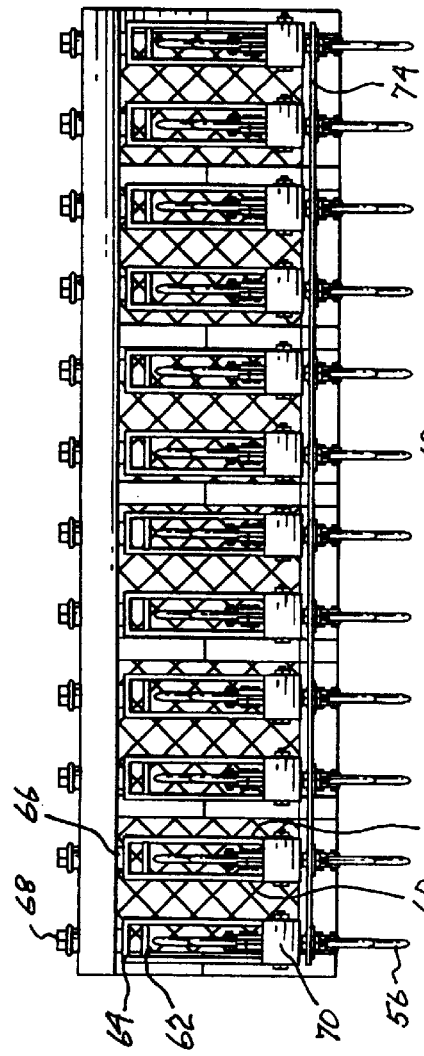
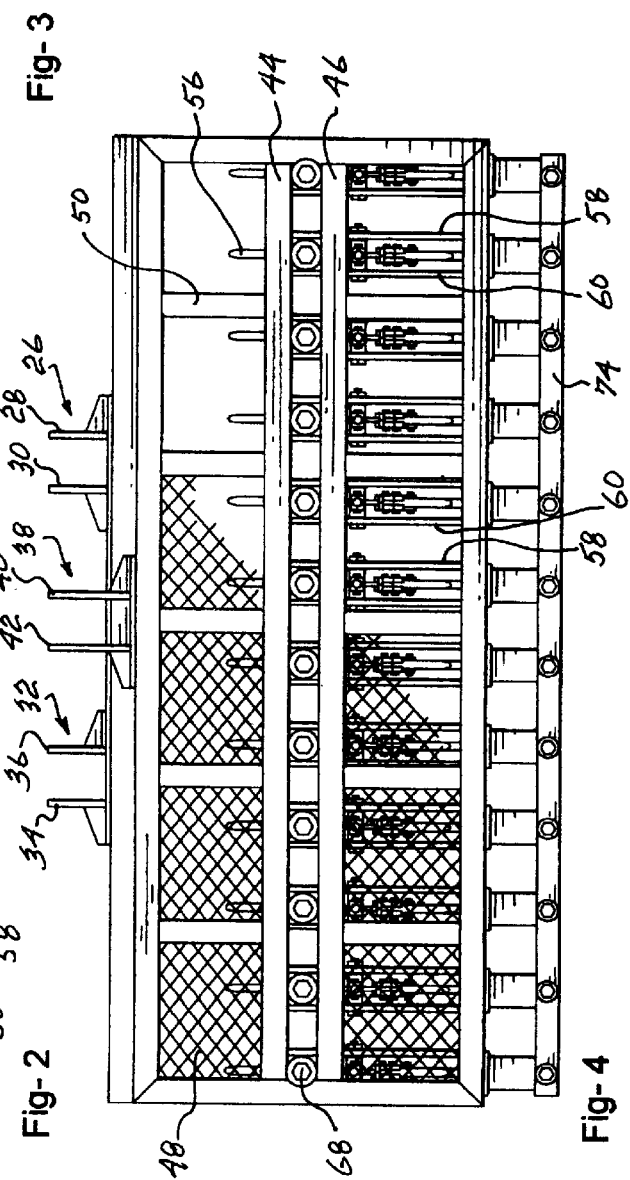
Fig-3
Fig-2
Fig-4

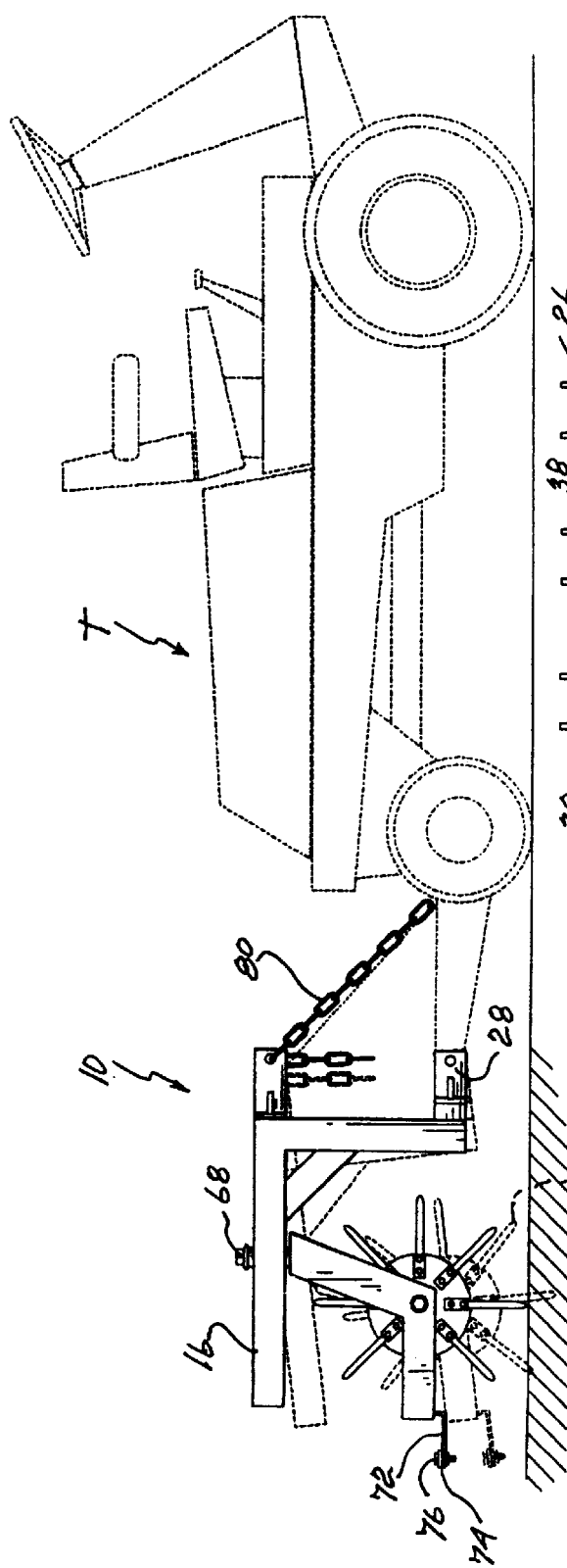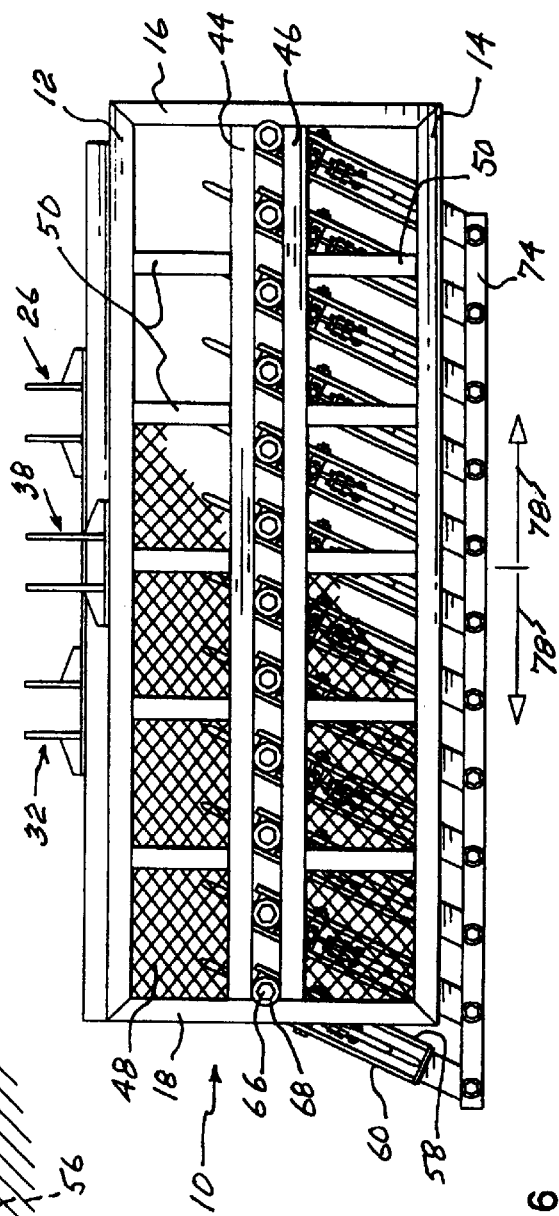

TURF AERATOR ATTACHMENT FOR TRACTOR

This application is based on Provisional Application 60/014,164 filed Mar. 27, 1996.

BACKGROUND OF THE INVENTION

The present invention relates to a turf perforating device or more particularly relates to a turf perforating device commonly known as an aerator and which is adapted to be pulled behind a vehicle such as a tractor.

SUMMARY OF THE INVENTION

The use of aerators is well known in the art and they are used to maintain a healthy vigorous growth of grass. Aerating devices range from those designed to be used by the individual homeowner on a relatively small lawn area to those designed to be pulled behind tractors for larger areas such as golf courses, parks, athletic fields, and all other suitable grassy areas.

Aerators generally include a plurality of elements which are designed to enter the soil as the aerator is pulled along. This is done for the purpose of pruning root growth, providing access for air and water to the soil, and for thatching the existing turf while leaving untouched the surrounding areas so that normal use of the turf may be continued.

As aforementioned, there are a number of known aerators which are adapted to be pulled by a vehicle such as a tractor and which aerators generally include a plurality of discs mounted on a shaft. Each of the discs includes a plurality of elements which are adapted to pierce the soil. In this respect, there have been several proposals for the type of element which will pierce the soil; some include a cylindrical shaped member having a hollow interior such that plugs are pulled from the soil. These are the so-called core aerators.

Also known in the art is what is known as a shatter aerator which does not pull a plug and consequently leaves a better looking surface. These aerators include specially shaped tines or spoons which can enter the soil and both opens and closes the soil to a certain extent.

The problem which has always existed is the use of the aerators on both uneven ground and the problems for following an irregular course—i.e. one in which turning is required. Thus, the conventional arrangement is one wherein all the discs are mounted on a single shaft and the amount of turning must be minimized to avoid substantial damage to the grounds and/or the equipment itself.

It is therefore an object of the present invention to provide an aerator of the type to be pulled or pushed by a vehicle such as a tractor and which aerator can follow other than a straight line without damage to the equipment and/or turf.

It is a further object of the present invention to provide an aerator attachment for a tractor and which aerator attachment can be designed to either be pushed ahead of a tractor or be towed thereby.

According to one aspect of the present invention, there is provided an aerator apparatus suitable for use with a tractor, the apparatus comprising a frame, a plurality of aerator disc assemblies, each aerator disc assembly comprising an aerator discs and aerator disc mounting means, each aerator disc having an aerator axle, at least one aerator tine extending radially outward from each of the aerator discs, the aerator disc mounting means extending between the frame and each of the aerator axles, the mounting means being rotatably journalled on the frame to thereby permit pivotable movement of each of the aerator discs, and interconnecting means connecting the aerator disc assemblies.

In greater detail, the aerator apparatus of the present invention can, as aforementioned, either be towed behind a tractor or mounted on the front of tractors which are designed to accept such equipment. The means for attaching the aerator apparatus to the tractor may be any conventional means including a draw bar, three point attachment, etc. It suffices to say that most tractor manufacturers have a standard attachment means.

Each aerator disc assembly of the present invention includes an aerator disc having at least one aerator tine extending radially outwardly therefrom. This is a conventional arrangement and the tines may be of the type adapted to remove a plug or they may be of the type known as shatter aerator tines or spoons which enters the soil and both opens and closes the soil. The number of tines extending radially outwardly from the disc may be varied and would typically range from between 6 and 12 times per aerator disc.

Each aerator disc has an axle associated therewith and mounting means are utilized to connect between the ends of each axle to the frame. The mounting means are rotatably journalled or mounted such that each mounting means and associated aerator disc which together comprise the aerator disc assembly can pivot or rotate. The connection between the frame and the mounting means can be any conventional arrangement.

BRIEF DESCRIPTION OF THE DRAWINGS

Having thus generally described the invention, reference will be made to the accompanying drawings illustrating an embodiment thereof, in which:

FIG. 2 is a rear elevational view of the aerator apparatus;

FIG. 3 is a side view of the aerator apparatus;

FIG. 4 is a top plan view of the aerator apparatus;

FIG. 5 is a side elevational view showing one means of attachment of the aerator apparatus to a tractor; and FIG. 6 is a top plan view similar to FIG. 4 illustrating the pivotatable or rotatable movement of the aerator disc assemblies.

DESCRIPTION OF THE PREFERRED EMBODIMENTS

Figure 1:
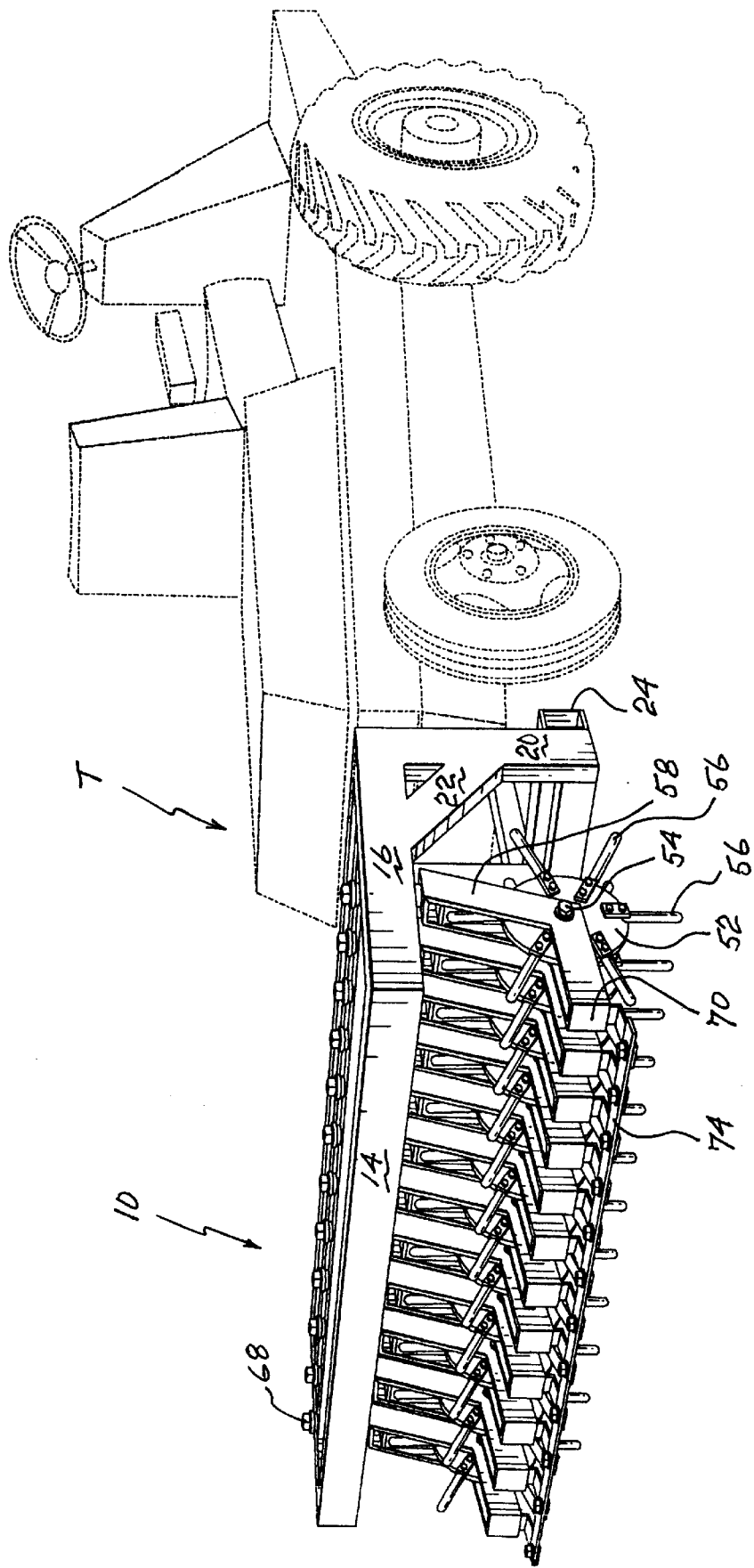
FIG. 1 is a perspective view of a tractor and aerator apparatus according to the present invention.

Referring to the drawings in greater detail and by reference characters thereto, the illustrated embodiment shows an aerator apparatus generally designated by reference numeral 10 and which aerator apparatus 10 is designed to be operated in conjunction with a tractor T.

Aerator apparatus 10 has an upper frame assembly comprising a pair of side frame members 12 and 14 and a pair of end frame members 16 and 18. As may be seen in FIG. 1 and 3, a vertical frame member 20 extends downwardly from the junction of side frame member 12 and end frame member 16. A reinforcing frame element 22 extends between end frame member 16 and vertical frame member 20. A similar arrangement (not shown), is provided on the other side at the point of juncture of side frame member 12 and end frame member 18. At the lower extremity of vertical frame member 20 there is provided a bottom horizontal frame member 24.

Bottom horizontal frame member 24 carry first and second lower attachment means 26 and 32 respectively. Lower attachment means 26 comprises a pair of outwardly extending plates 28 and 30 while lower attachment means 32 also includes outwardly extending plates 34 and 36. Mounted on side frame member 12 is a upper attachment means generally designated by reference numeral 38 and which comprises outwardly extending plates 40 and 42.

Extending between end frame members 16 and 18 and in a generally parallel relationship with side frame members 12 and 14 are a pair of horizontal mounting bars 44 and 46 (FIGS. 4 and 6). A plurality of frame elements 50 extend between horizontal mounting bar 44 and side frame member 12 and also between horizontal mounting bar 46 and side frame member 14. A metal mesh 48 covers the top portion of the apparatus.

Aerator apparatus 10 includes a plurality of aerator discs 52 mounted in a side by side arrangement with each disc including an axle 54 and having tines 56 extending radially therefrom. Each disc 52 has mounting means associated therewith, the mounting means comprising a pair of parallel mounting arms 58 and 60 which, at their upper end, have a pair of horizontal elements 62 and 64 extending therebetween. The arrangement is such to receive a shaft 66 which is retained by means of shaft retaining nut 68.

At their lower extremity, mounting arms 58 and 60 are interconnected by an end wall 70 which in turn has a bracket 72 extending therefrom.

Brackets 72 are interconnected by horizontal interconnecting member 74 by a nut a bolt arrangement 76.

The arrangement is such that when towed or pushed, each mounting means is pivotable or rotatable due to the rotatable mounting of shaft 66. Interconnecting member 74 ensures that all discs 52 turn simultaneously as indicated by arrows 78 (FIG. 6).

As aforementioned, the attachment by means of a pair of lower attachment means 26 and 32 is substantially conventional while upper attachment means 38 may be designed to receive a chain 80 for further attachment to the tractor T.

It will be understood that the above described embodiment is for purposes of illustration only and that changes and modifications may be made thereto without the departing from the spirit and scope of the invention.

I claim:

1. An aerator apparatus suitable for use with a tractor, said apparatus comprising:

a frame, a plurality of aerator disc assemblies, each aerator disc assembly comprising an aerator disc and aerator disc mounting means, each aerator disc having an aerator axle, at least one aerator tine extending radially outward from each of said aerator discs, each aerator disc mounting means extending between said frame and each of said aerator axles, each aerator disc mounting means being rotatably journalled on said frame to thereby permit each of said aerator discs to be turned in response to a direction change of the tractor, and interconnecting means connecting each of said aerator disc mounting means to maintain parallel alignment of said aerator discs.

2. The apparatus of claim 1 wherein each of said aerator discs includes a plurality of radially extending tines.

3. The apparatus of claim 1 wherein each of said mounting means comprises a pair of mounting arms, each of said mounting arms extending between said frame and a respective end of said axle.

4. The apparatus of claim 1 wherein said interconnecting means comprises a connecting member extending between said aerator disc assemblies.

5. The apparatus of claim 1 further including attachment means associated with said frame for attaching said apparatus to a tractor.

6. The apparatus of claim 1 wherein each of said mounting means comprises first and second parallel mounting arms, said first and second parallel mounting arms being joined together at one end thereof by a pair of horizontal elements at an end thereof, a shaft extending between said frame and an upper element of said pair of horizontal elements to permit rotatable movement of said parallel arms with respect to said frame.

\* \* \* \* \*